(12) United States Patent
Marcondes et al.

(10) Patent No.: US 10,539,101 B2
(45) Date of Patent: Jan. 21, 2020

(54) FILTERING DEVICE, FILTERING ELEMENT AND MAINTENANCE PROCESS OF A FILTERING DEVICE

(71) Applicant: MANN+HUMMEL GMBH, Ludwigsburg (DE)

(72) Inventors: Marcos Marcondes, Indaiatuba (BR); Bruna de Carvalho Vessio, Indaiatuba (BR); Celio Santos Pereira, Pilar do Sul (BR); Gilberto Albertini, Indaiatuba (BR)

(73) Assignee: MANN+HUMMEL GmbH, Ludwigsburg (DE)

( * ) Notice: Subject to any disclaimer, the term of this patent is extended or adjusted under 35 U.S.C. 154(b) by 236 days.

(21) Appl. No.: 15/601,407

(22) Filed: May 22, 2017

(65) Prior Publication Data

US 2017/0254301 A1    Sep. 7, 2017

Related U.S. Application Data

(63) Continuation of application No. PCT/EP2014/075375, filed on Nov. 24, 2014.

(51) Int. Cl.
*F02M 35/04* (2006.01)
*F02M 35/02* (2006.01)
(Continued)

(52) U.S. Cl.
CPC ....... *F02M 35/048* (2013.01); *B01D 46/0005* (2013.01); *B01D 46/2414* (2013.01);
(Continued)

(58) Field of Classification Search
CPC ............. F02M 35/048; F02M 35/0203; F02M 35/0214; F02M 35/0216; F02M 35/0223; F02M 35/02416; F02M 35/02483; F02M 35/084; F02M 35/088; F02M 35/10013; F02M 35/164; B01D 46/0005; B01D 46/2411; B01D 46/2414; B01D 46/521; B01D 2265/024; B01D 2265/026; B01D 50/002

See application file for complete search history.

(56) References Cited

U.S. PATENT DOCUMENTS

| 2009/0094951 | A1* | 4/2009 | Baseotto | B01D 46/0024 55/498 |
| 2010/0275559 | A1 | 11/2010 | Steins et al. | |
| 2014/0373495 | A1* | 12/2014 | Madeira | F02M 35/0204 55/502 |

FOREIGN PATENT DOCUMENTS

DE    102009036475 A1    2/2011

* cited by examiner

*Primary Examiner* — Robert Clemente
(74) *Attorney, Agent, or Firm* — James Hasselbeck

(57) ABSTRACT

The present invention belongs to the technical sector of fluid filtration systems which can be used for air filtration in an internal combustion engine.
The invention refers to a filtering device (1) including a filtering element (24) which presents an open axial end (26) and an axial end (27) closed by a cover (28); and an intake cover (7). The said cover (28) includes at least a first tubular boss (55) projecting towards the intake cover (7); and the intake cover (7) includes at least a second tubular boss (57) complementary to the first tubular boss (55) and projecting towards the cover (28); the first tubular boss (55) is slotted in the second tubular boss (57).
The invention also refers to a tubular filtering element (24) and to a maintenance process of a filtering device.

14 Claims, 11 Drawing Sheets

(51) Int. Cl.
*F02M 35/024* (2006.01)
*F02M 35/022* (2006.01)
*B01D 46/00* (2006.01)
*F02M 35/08* (2006.01)
*B01D 46/24* (2006.01)
*B01D 50/00* (2006.01)

(52) U.S. Cl.
CPC ....... *B01D 50/002* (2013.01); *F02M 35/0203* (2013.01); *F02M 35/0216* (2013.01); *F02M 35/0223* (2013.01); *F02M 35/02483* (2013.01); *F02M 35/084* (2013.01)

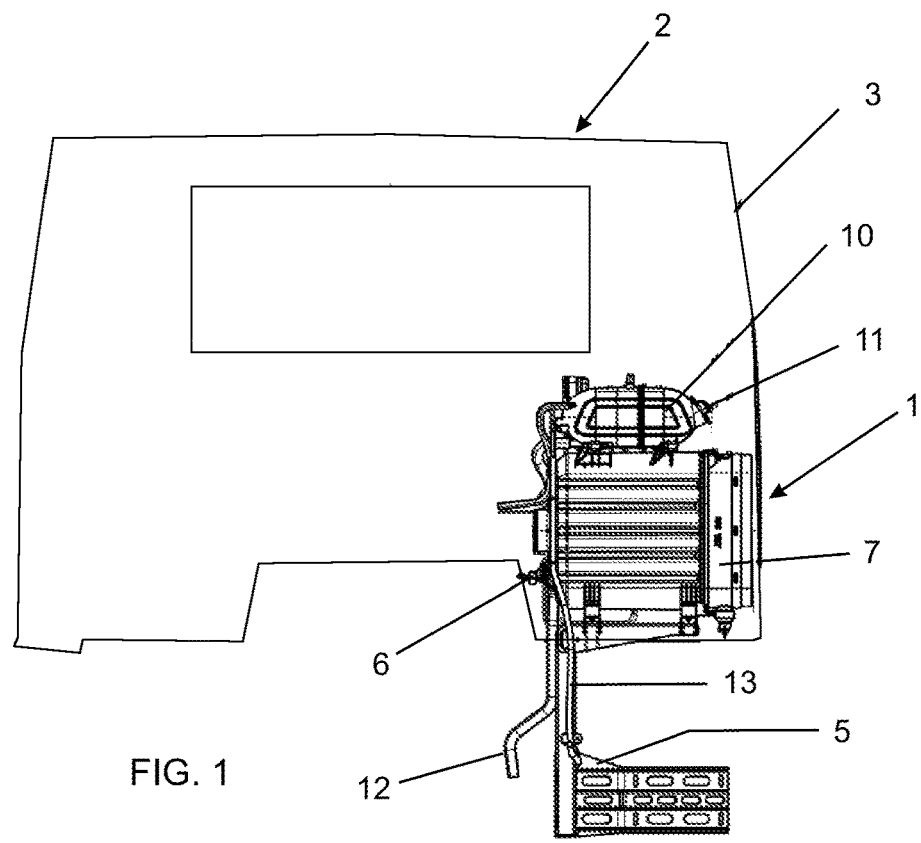
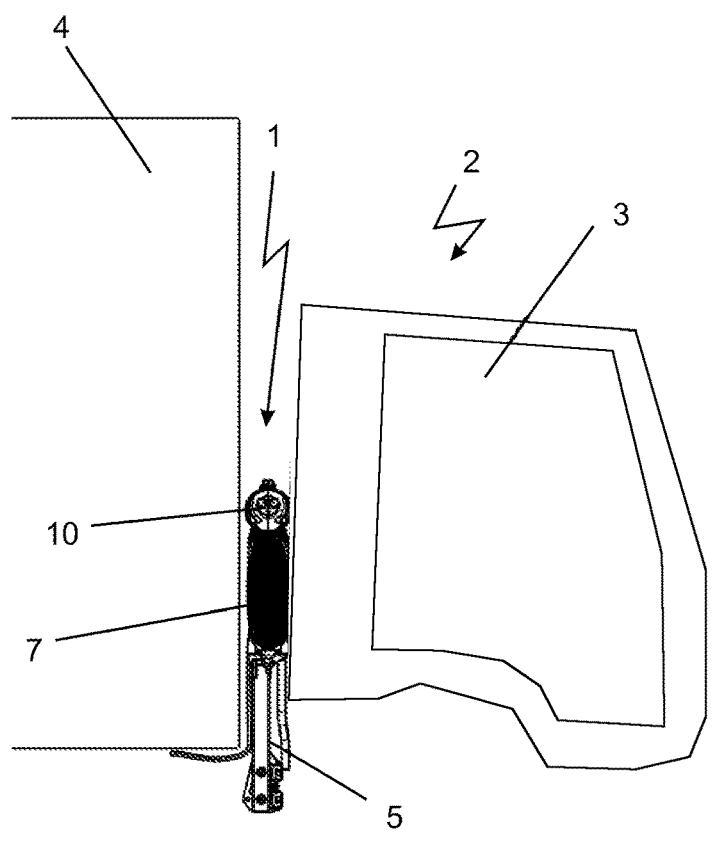
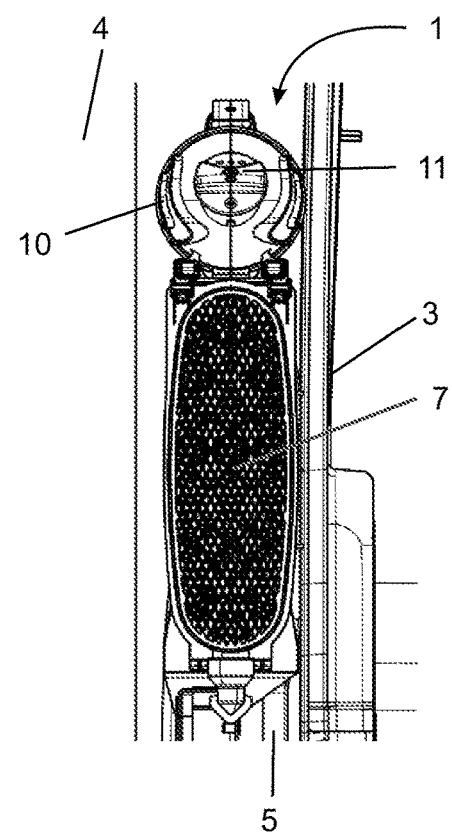
FIG. 1
FIG. 2
FIG. 3

FILTERING DEVICE, FILTERING ELEMENT AND MAINTENANCE PROCESS OF A FILTERING DEVICE

TECHNICAL FIELD

The present invention relates to fluid filtration systems that can be used in an internal combustion engine.

BACKGROUND

Document WO2014/121990 describes an air filter including an inner filtering element and an outer filtering element. Documents US2005/0016138, US2008/0209869, and US2014/299540 describe cyclone fluid pre-cleaners. Document WO2009/047196 describes a sealing function of a filtering element and of a filtration system.

SUMMARY

The purpose of the present invention is that of improving the devices known so far.

To this end, the invention relates to a filtering device including a housing body which delimits a cavity and is equipped with a filtered air outlet; a tubular filtering element installed in the said cavity and presenting an open axial end placed around the said filtered air outlet, and an axial end closed by a cover; and an intake cover which closes the said cavity opposite the filtered air outlet. The said cover includes at least a first tubular boss projecting towards the intake cover; and the intake cover includes at least a second tubular boss complementary to the first tubular boss and projecting towards the cover; the first tubular boss being slotted in the second tubular boss.

The filtering device may also include either one of the following optional characteristics, or a combination of these characteristics.

The second tubular boss includes a bracket placed against the cover in order to maintain a space between the cover and the intake cover.

The first tubular boss presents a cavity along its axis.

The bracket is a central bracket along the axis of the second cylindrical boss, wherein this central bracket central is inserted in the said cavity.

The central bracket is equipped with an exhaust hole.

The first tubular boss presents a beveled end on its edge.

The beveled end is compressed at the bottom of the second tubular boss.

The distance between the cover and the beveled end is greater than the distance between the bracket and the bottom of the second tubular boss.

The first tubular boss and the second tubular boss are round in section.

The cover includes two first tubular bosses and the intake cover includes two second tubular bosses.

The intake cover includes a cyclone pre-cleaner.

The invention also relates to a tubular filtering element presenting an open axial end and an axial end closed by a cover. The said cover includes at least a first tubular boss projecting perpendicularly to the cover.

The tubular filtering element may also include either one of the following optional characteristics, or a combination of these characteristics.

The said tubular boss presents a cavity along its axis.

The said first tubular boss presents a beveled end on its edge.

The tubular filtering element includes two of the said first tubular bosses.

The cover includes two slides.

The invention is also related to a maintenance process of a filtering device including a housing body which delimits a cavity and is equipped with a filtered air outlet; a tubular filtering element installed in the said cavity and presenting an open axial end placed around the said filtered air outlet, and an axial end closed by a cover; and an intake cover which closes the said cavity opposite the filtered air outlet; the said cover includes at least a first tubular boss projecting towards the intake cover; and the intake cover includes at least a second tubular boss complementary to the first tubular boss and projecting towards the cover; the first tubular boss is slotted in the second tubular boss. The process includes the following steps:

opening the intake cover;
withdrawing a used filtering element;
inserting a new housing body inside the housing body;
closing the intake cover so that the first tubular boss of the cover is slotted in the second tubular boss of the intake cover.

BRIEF DESCRIPTION OF THE DRAWINGS

The invention is explained below by the description of a preferred embodiment, given as an example, with reference to the figures, in which:

FIG. 1 represents a filtering device, in conformity with the invention, mounted on a vehicle;

FIG. 2 is a side view of the vehicle of FIG. 2;

FIG. 3 is an enlarged view of FIG. 2 which shows the filtering device;

Figure 22:
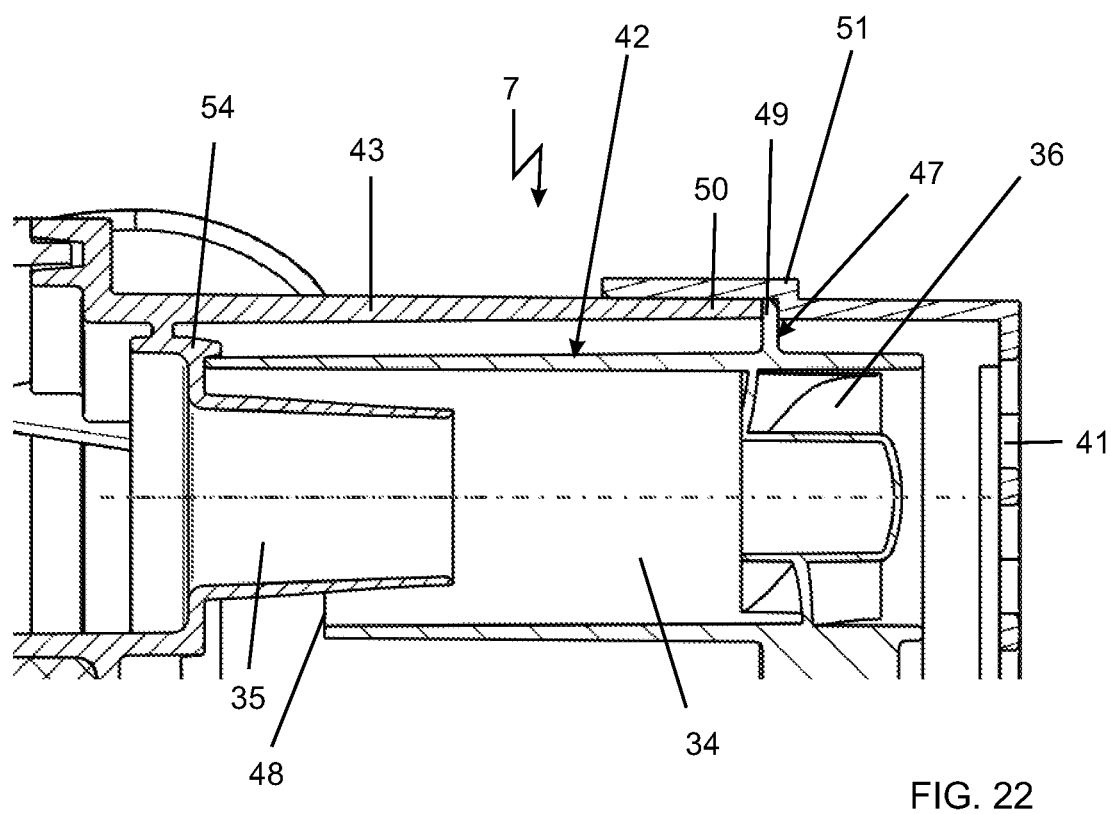
Figure 23:
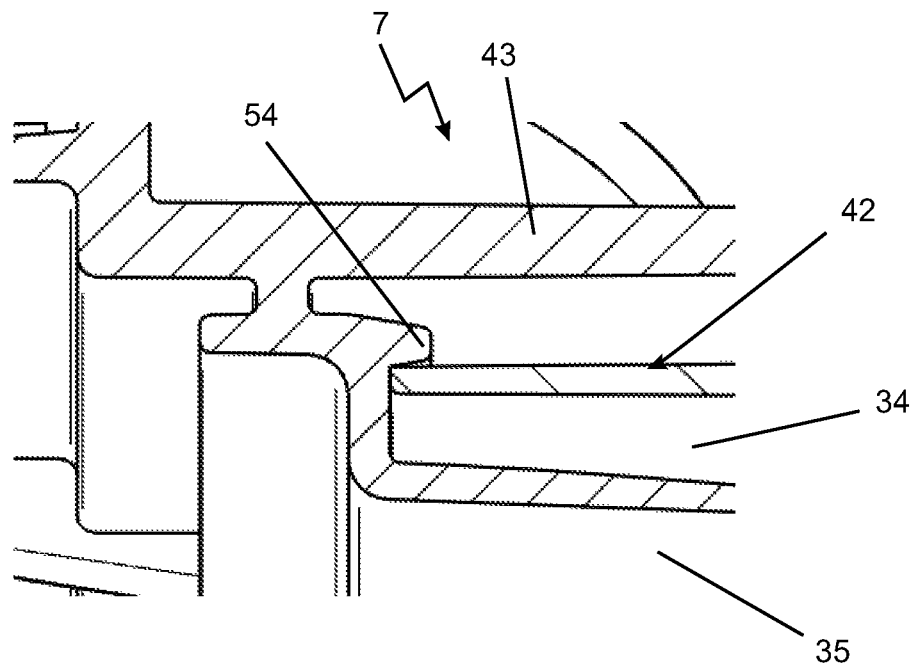
Figures 24, 25:
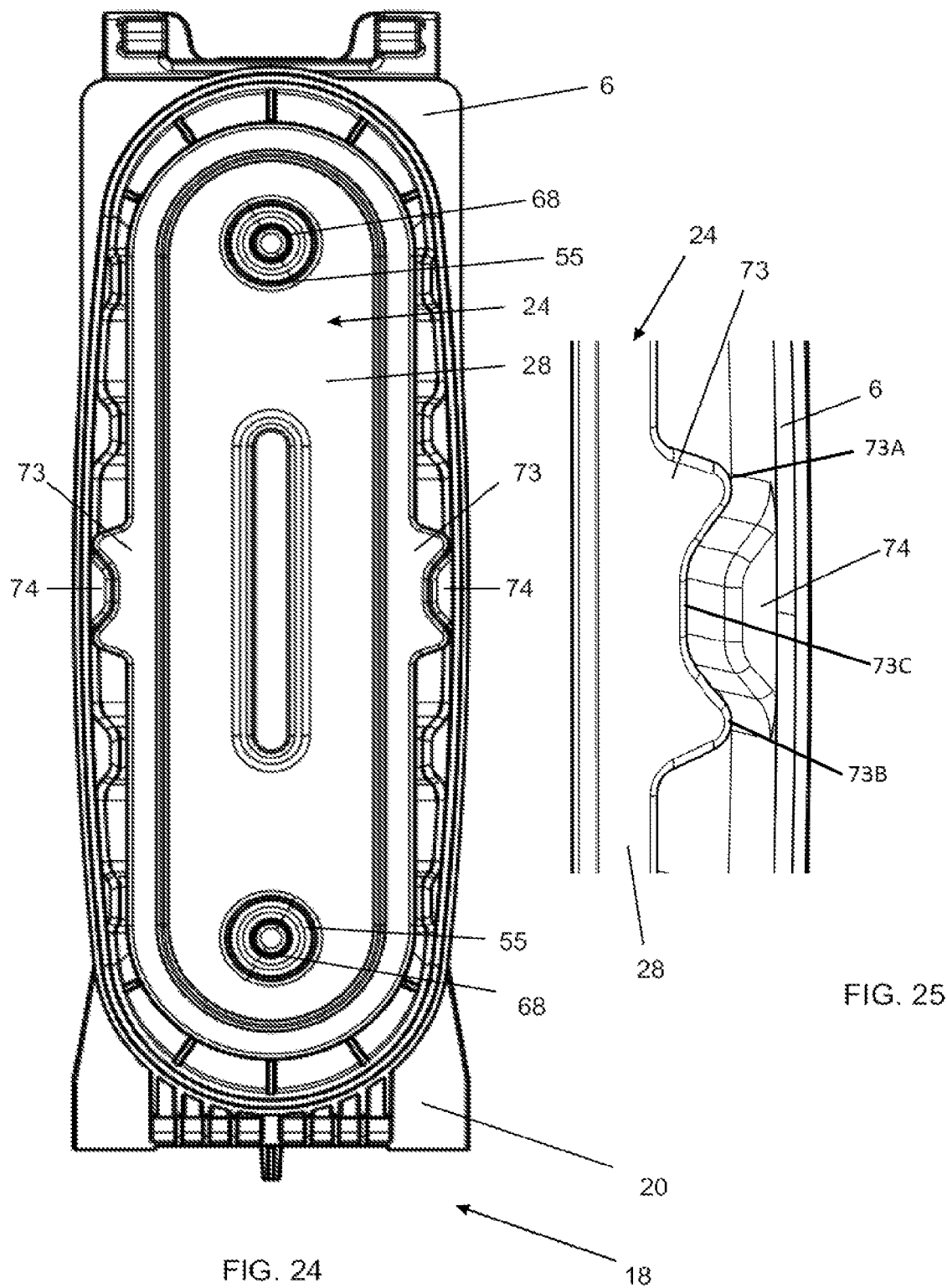

views 19, 20, and 21 are sectional-detailed views of the intake cover of the filtering device, showing three alternative assemblage modes;

FIG. 22 is a sectional-detailed view of the intake cover;

FIG. 23 is an enlarged view of detail XXIII of FIG. 23;

FIG. 24 is a front view of the filtering device; and

FIG. 25 is a perspective detailed of FIG. 25.

DETAILED DESCRIPTION

FIGS. 1, 2 and 3 represent filtering device 1 mounted on a vehicle 2. In the present example, vehicle 2 is a light commercial vehicle comprising a cab 3 and a compartment 4.

Filtering device 1 is preferably mounted on an outer structure 5 of vehicle 2 so that it can be placed between cab 2 and compartment 4, especially on the back of the cab 3.

Figure 4:
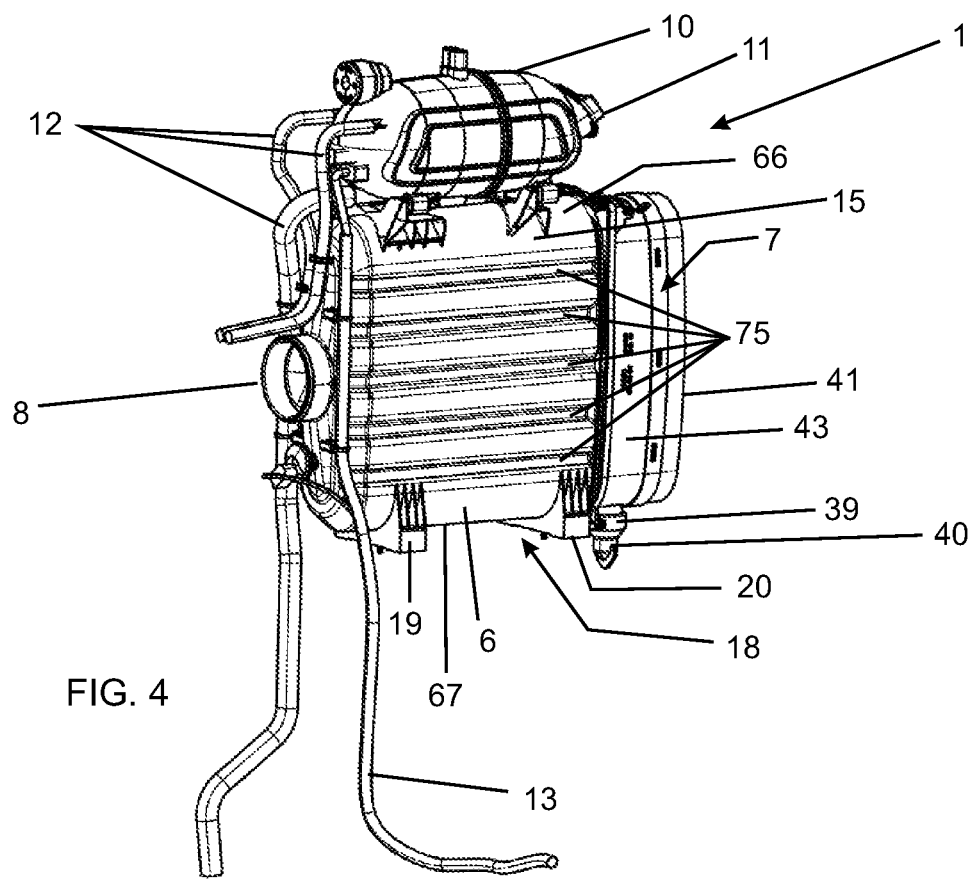
FIG. 4 is a perspective view of the filtering device.

FIG. 4 separately represents filtering device 1. It preferably includes a housing body 6, an intake cover 7 and a filtered air outlet 8. The intake cover 7 and air outlet 8 are preferably located at opposite ends of the filtering device 1, defining a distance in axial direction.

Filtering device 1 may be used, as in the present embodiment, as an air filter for a combustion engine. The function of filtering device 1 is that of providing filtered air to the engine of vehicle 2.

Thereunto, the air is aspirated by intake cover 7 preferably essentially in axial direction, is filtered inside housing body 6 by filtering element 24, and leaves through filtered air outlet 8 which is connected to the engine preferably in axial direction. The filtering device 1 is preferably arranged in a position so that the axial direction defined above is essentially horizontal.

Filtering device 1 may also include a fluid reservoir 10 which can contain any fluid, especially liquid suitable for the functionality of the engine and/or for the other elements of vehicle 2 such as the coolant, glass cleaning liquid, break liquid, etc.

As shown in the present embodiment, reservoir 10 may be a coolant reservoir for the engine of vehicle 2.

Reservoir 10 preferably includes a cover 11 and is connected to fluid pipes 12 and electric cables 13, necessary for the functionality of reservoir 10. Fluid pipes 12 are connected to the engine and electric cables 13 are connected to the engine control system.

Figure 5:
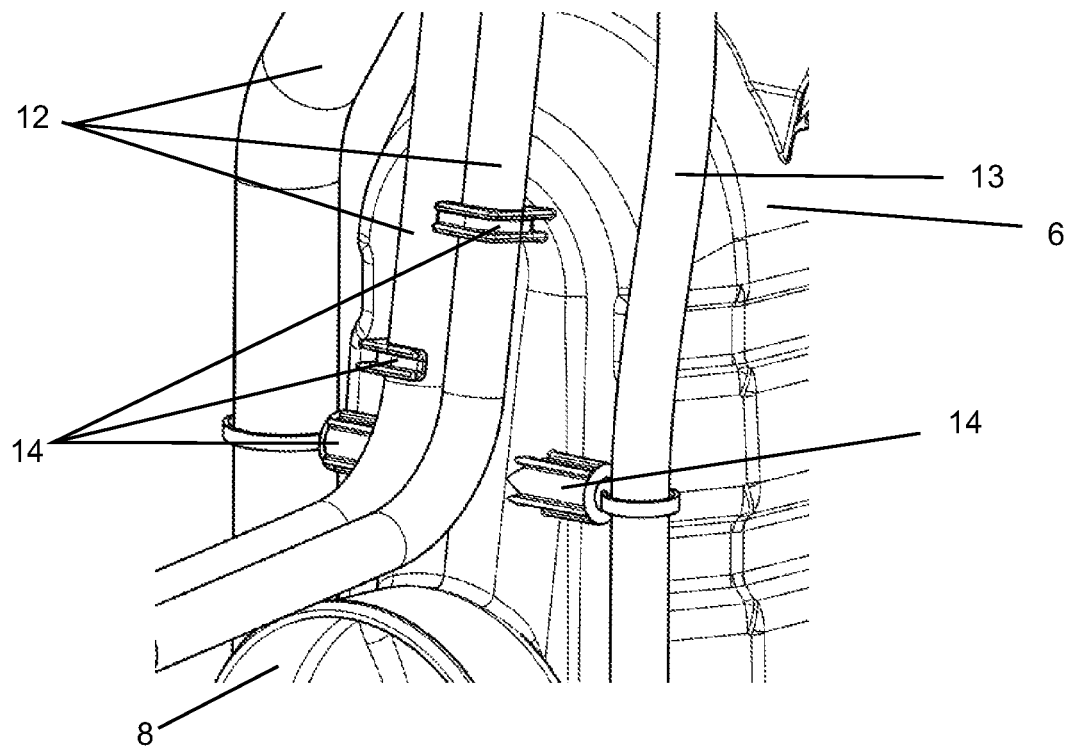
FIGS. 5, 6, 7, and 7A are detailed views of FIG. 4.

Housing body 6 includes claws 14 to keep pipes 12 and cables 13 so that they neatly surround filtered air outlet 8 and that they stay fixed (FIG. 5). The claws 14 are preferably located at the outlet end of the housing body 6, preferably in proximity to the filtered air outlet 8.

Figure 6:
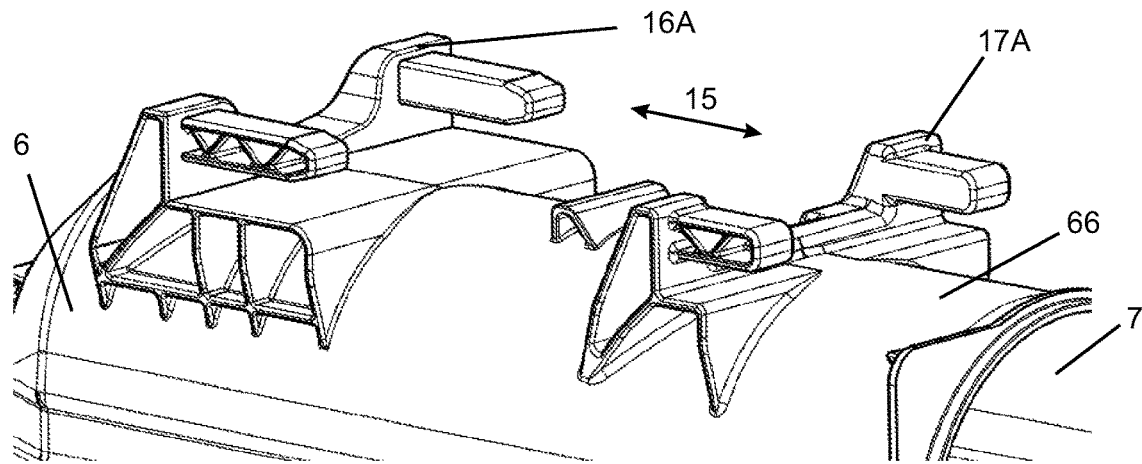

In reference to FIG. 6, housing body 6 is preferably equipped with a support 15 for reservoir 10. Support 15 includes a rear fitting bracket 16A, a front fitting bracket 17A, and a first element 71 of a retention system 70. Support 15 is preferably located either on the top side or bottom side of housing body 6.

Figure 7:
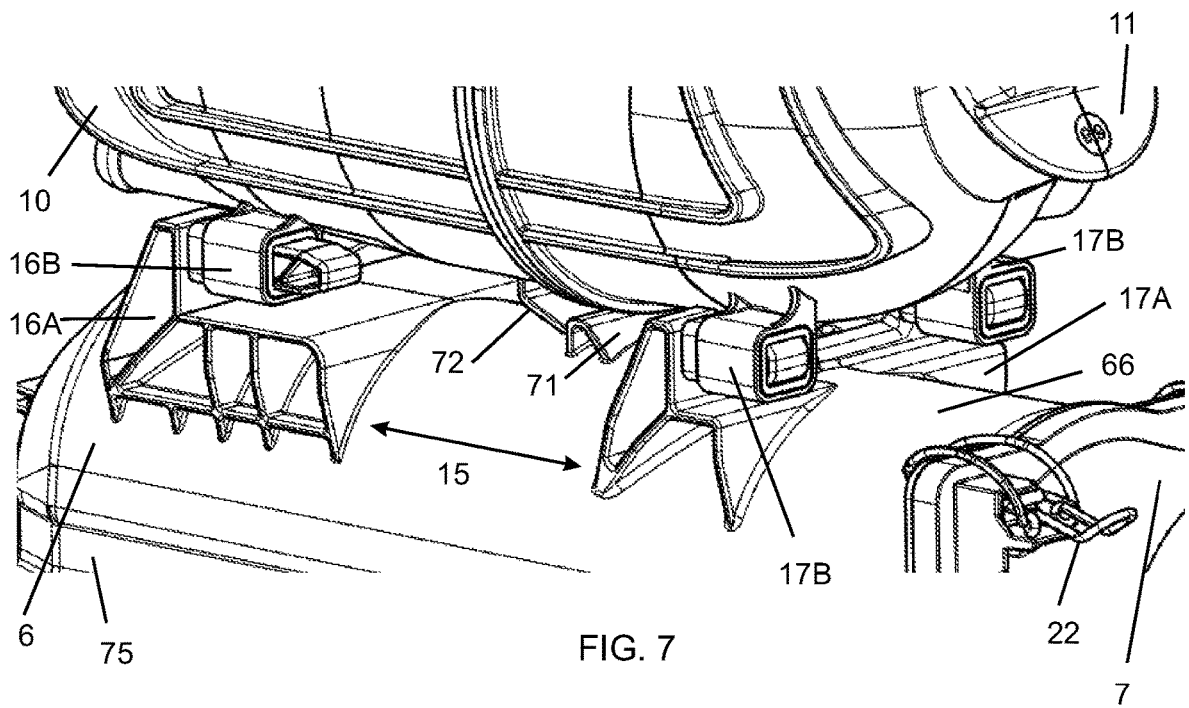
Figure 7A:
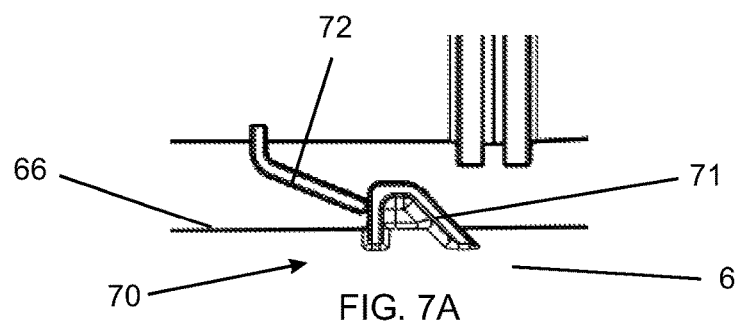

Reservoir 10 is, on the other hand, preferably equipped with at least one rear housing 16B and/or one front housing 17B, adjusted to at least one fitting bracket 16A, 17A of housing body 6 (FIG. 7). Housings 16B, 17B of reservoir 10 may be internally coated with rubber, so that the contact between each fitting bracket 16A, 17A and corresponding housing 16B, 17B occurs through a rubber thickness for a clearance-free and flexible fastening of reservoir 10.

At the time of the assemblage of reservoir 10 on housing body 6, reservoir 10 is axially slotted in support 15. Preferably, it is slotted in a way that brackets 16A, 17A project into housings 16B, 17B, thereby providing a form-fit connection. Housings 16B, 17B may slide and/or be guided along brackets 16A, 17A. Preferably, fitting brackets 16A, 17A and the housings 16B, 17B cooperate as shown in FIG. 7, wherein the reservoir slides in an axial direction, preferably along a defined track to an end position where the reservoir is fixed, for example by a screw. Preferably, the reservoir 10 and the housing body 6 comprise a retention system 70 for fixing the reservoir 10 in its end position. The retention system is preferably provided as a snap-fit connection. The snap fit connection may be consisting of a first element 71, fastened on housing body 6, and a second element 72, fastened on reservoir 10. In the present example, the first element is a latch 71 and the second element is a jag 72. Alternatively, these elements 71, 72 can be swapped round or replaced by others elements adapted to the function of the retention system 70, like, for example, clips or clamps. With the snap-fit connection, the reservoir 10 can slide until the arrest of the retention system whereby the reservoir is safely fixed in its end position without a further separate assembly step like screwing, welding or gluing.

This set-up ensures a simple and safe assembly and disassembly of reservoir 10 on support 15.

Housing body 6 also preferably includes a pedestal 18 for fastening filtering device 1 on the vehicle.

Figure 7B:
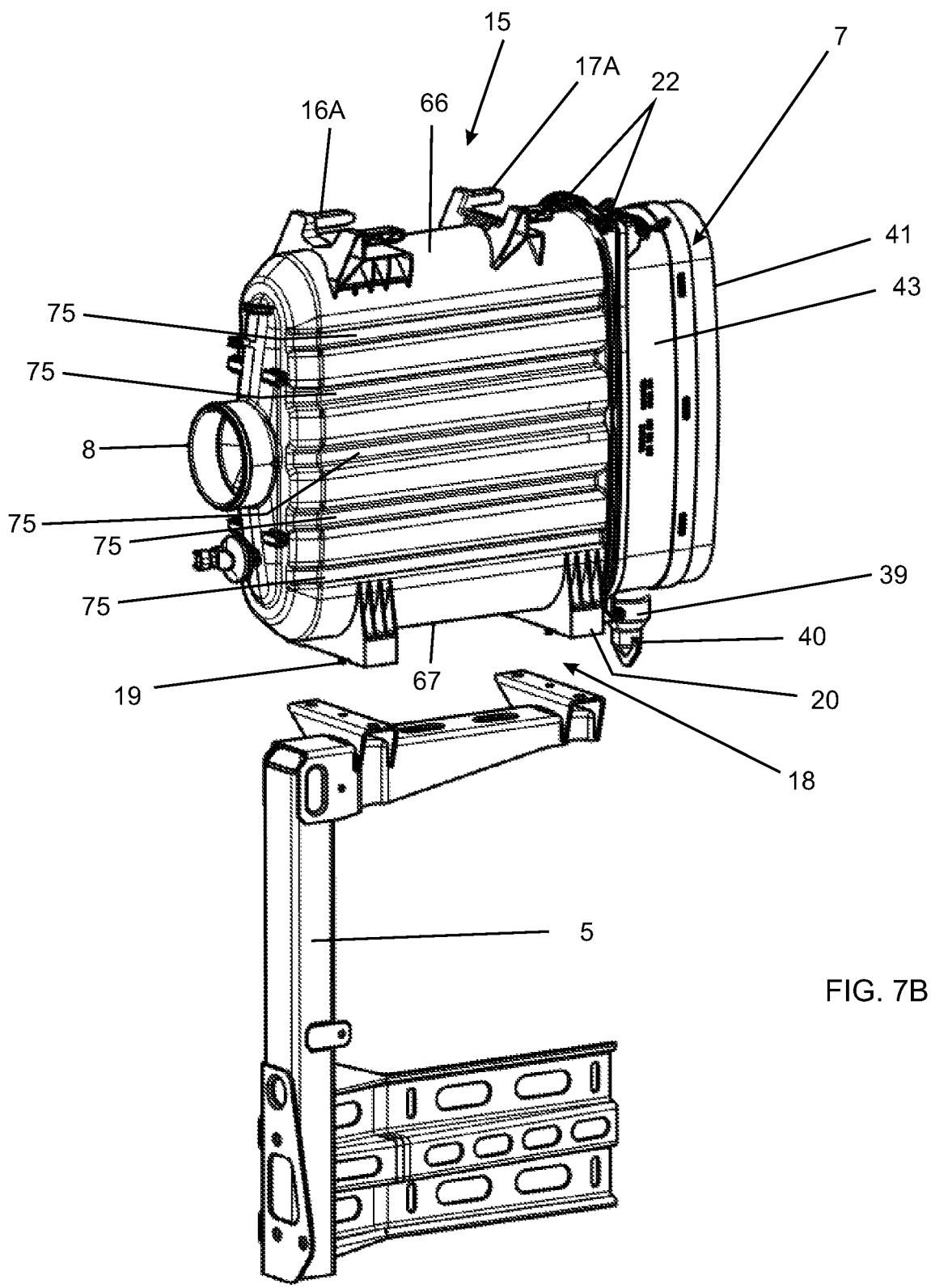
FIG. 7B is a perspective view of the filtering device and of its means for assemblage on the vehicle.

Pedestal 18 may comprise two fastening supports 19, 20 that are bolted on an outer structure 5 of vehicle 2 (FIG. 7B).

The housing body 6 also preferably includes stiffening grooves 75 between the pedestal 18 and the support 15.

Thus filtering device 1 preferably forms an autonomous set which carries out both the function of air filtration for the engine and support for reservoir 10, driving pipes 12 and cables 13. The fastening of this set is advantageously simply carried out through the fastening of pedestal 18 to vehicle 2.

In reference to FIGS. 2 and 3, filtering device 1 may be mounted on external structure 5 of vehicle 2 so that intake cover 7 and cover 11 of reservoir 10 are accessible from the outside of the vehicle for an easy accessibility.

In this embodiment, housing body 6 preferably has an essentially oblong cross section along the axial direction, defining a vertically upper edge 66 and lower edge 67 of housing body 6. Pedestal 18 may be placed on lower edge 67 as shown in the Figure or on a sidewall. Support 15 for fluid reservoir 10 is preferably placed on upper edge 66, although it can also be placed at the lower edge 67 in case the pedestal is located on a sidewall.

Thus, reservoir 10 is preferably on top of filtering device 1, which creates a tight set vertically assembled in an interstice of vehicle 2, between cab 3 and compartment 4. Such localization facilitates the operations of maintenance and control of the filtering device insofar as intake cover 7 and cover 11 of reservoir 10 may be directly removed from the outside of the vehicle.

The arrangement of filtering device 1 also makes room in the engine compartment. Alternatively, filtering device 1 may be also placed in another interstice of the vehicle where it is practical and accessible, for example, in a horizontal interstice.

Such ready accessibility allows the opening of filtering device 1, that is, the removal of intake cover 7.

Figure 8:
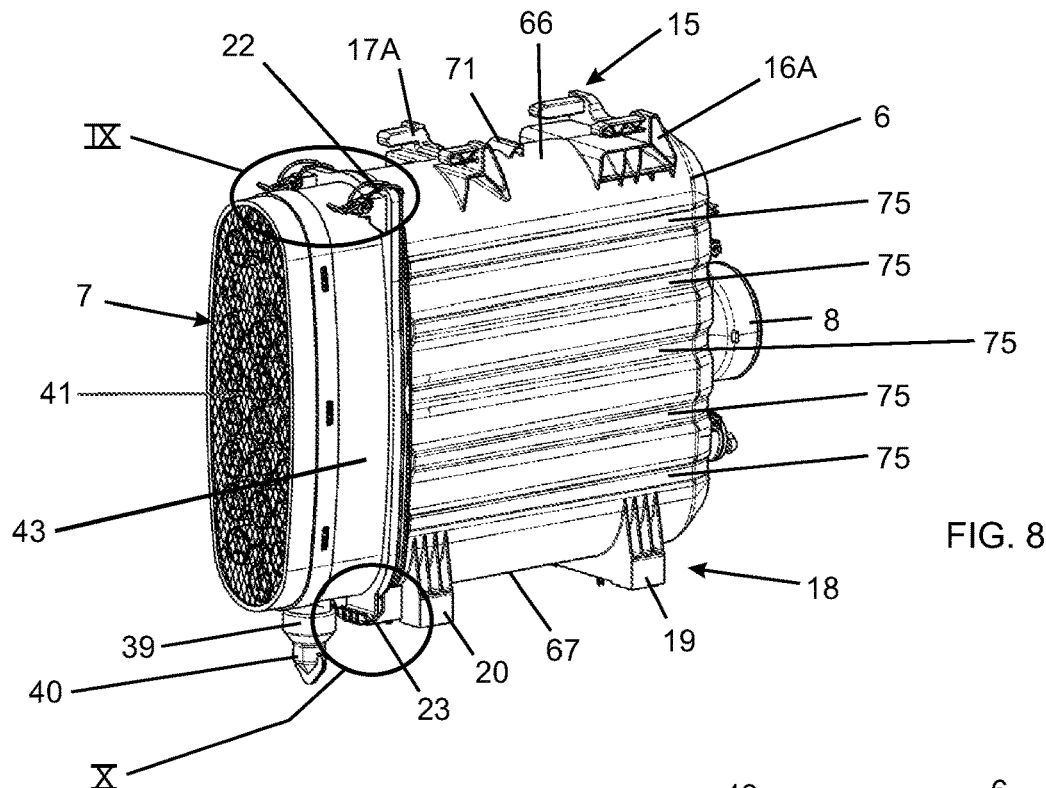
FIG. 8 is a perspective view of the filtering device.
Figure 9:
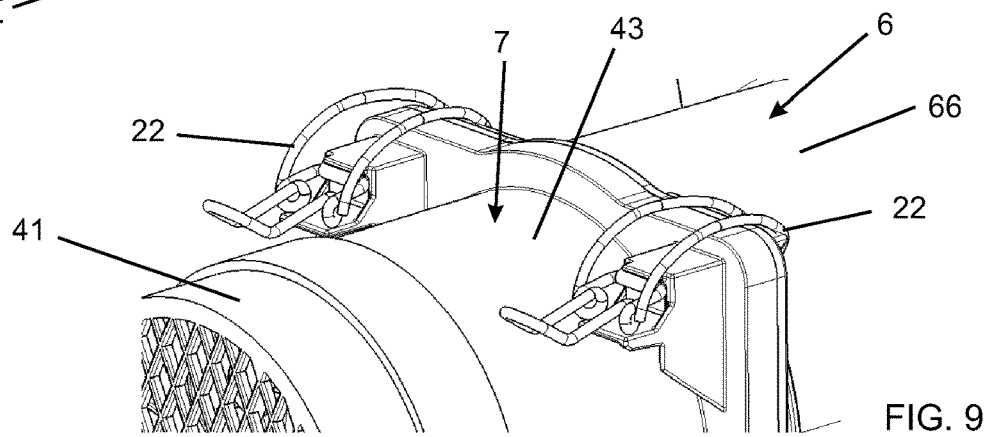
FIGS. 9 and 10 are enlarged views of FIG. 8, of details IX and X, respectively.
Figure 10:
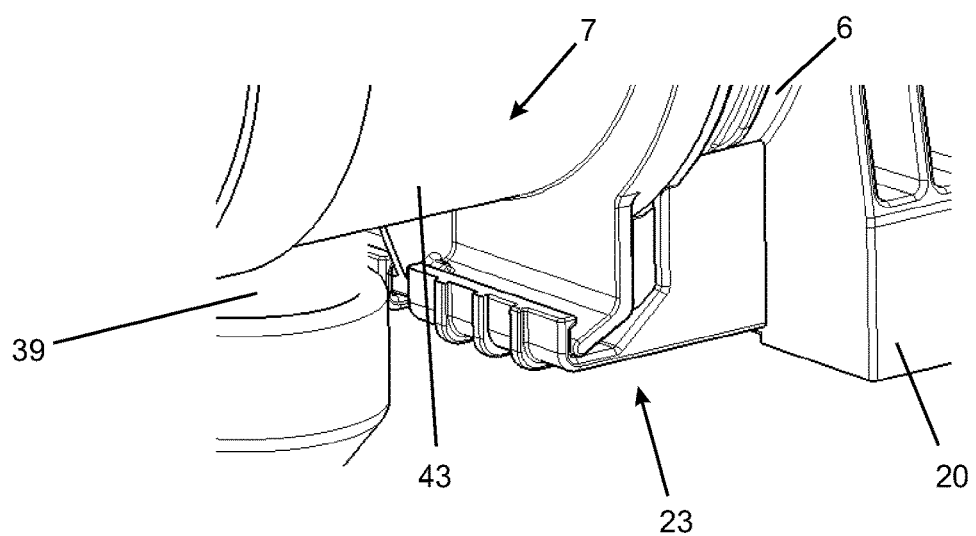

FIG. 8 shows one embodiment of fastening means of intake cover 7 on housing body 6. Such fastening means may comprise upper and lower fasteners, the fasteners preferably including one or a pair of upper clips 22 (see FIG. 9) and/or a lower hinge 23 (see FIG. 10).

The removal of intake cover 7 is carried out by disengaging the pair of clips 22 and swing intake cover 7 backwards about the hinge 23 until releasing hinge 23, thus releasing intake cover 7.

Figure 11:
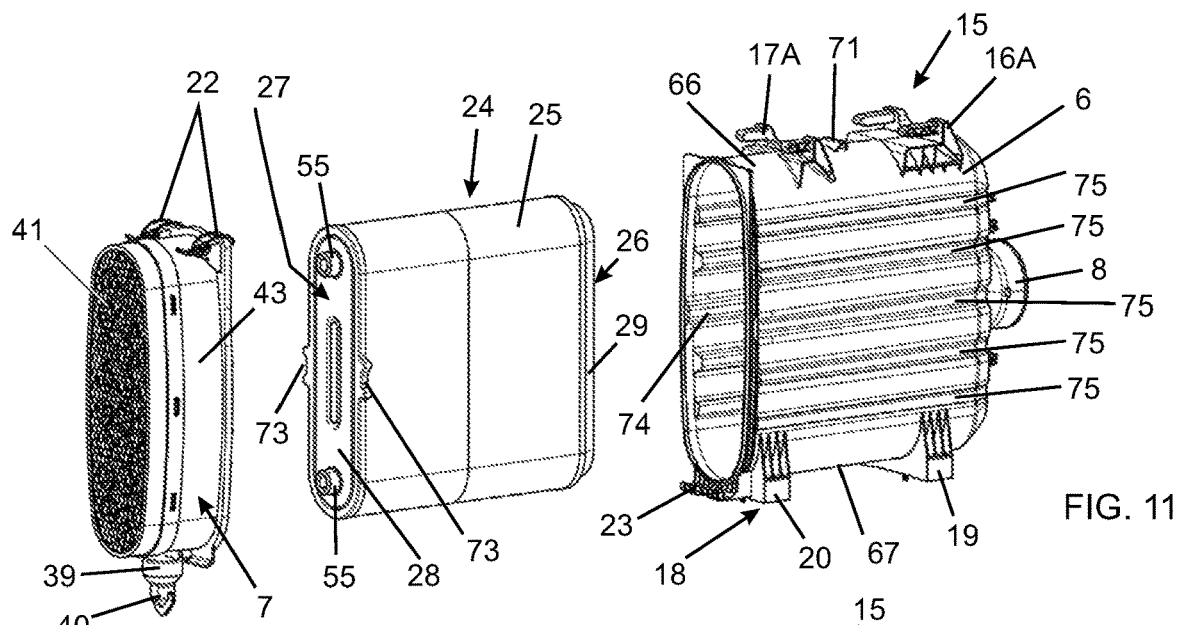
FIG. 11 is an exploded view of the filtering device.

The hinge 23 preferably comprises a housing body hinge part and a intake cover hinge part, wherein those parts FIG. 11 is an exploded view showing intake cover 7 disassembled. Filtering element 24 is mounted inside housing body 6 and is also represented disassembled in its exploded view of FIG. 11. Housing body 6 delimits a cavity to receive a filtering element 24.

Filtering element 24 is hollow and tubular in shape. It preferably comprises a pleated, star-shaped filter bellow 25 made of a filter media like paper or non-woven and may be coated with filtering coating like micro- or nano-fibers. The filter element preferably presents an open axial end 26, and a closed axial end 27 with a cover 28. The cover can also be defined as an end disc or end cap. Along its circumference, open axial extremity 26 includes a gasket 29 for the sealing with housing body 6. The filter element 24 preferably has an oval shape, either elliptical or established by two opposing sections creating opposing half circles which are connected by totally straight or almost straight lines. The housing body 6 and the intake cover preferably mirror the shape of the filter element 24 and are also oval, wherein the filter element 24 and the housing body have section with a height that is at least twice, preferably three times bigger than the width in horizontal direction perpendicular to the axial direction.

Figure 12:
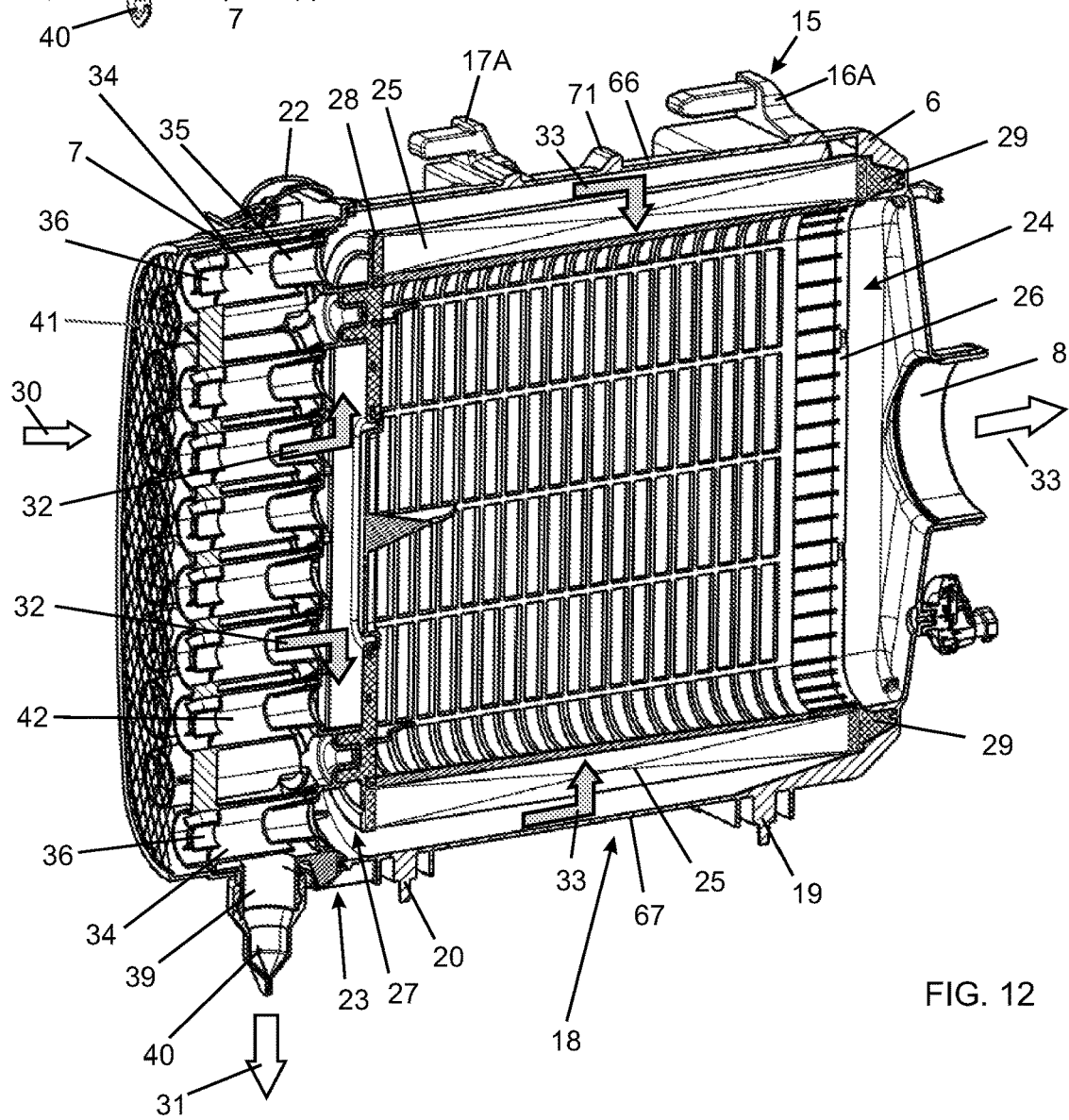
FIG. 12 represents both a perspective and a longitudinal-sectional view of the filtering device.

Cover 28 preferably includes two slides 73 located at the long sides of the cover which are preferably cooperating with two rails 74 of housing body 6, to place filtering element 24 crosswise. This allows positioning the filtering element 24 in its vertical end position before closing the intake cover 7 which interacts with the filtering elements 24 cover 28. FIG. 12 shows, in section, housing body 6 with filtering element 24 mounted inside it and with intake cover 7 closed.

Figure 13:
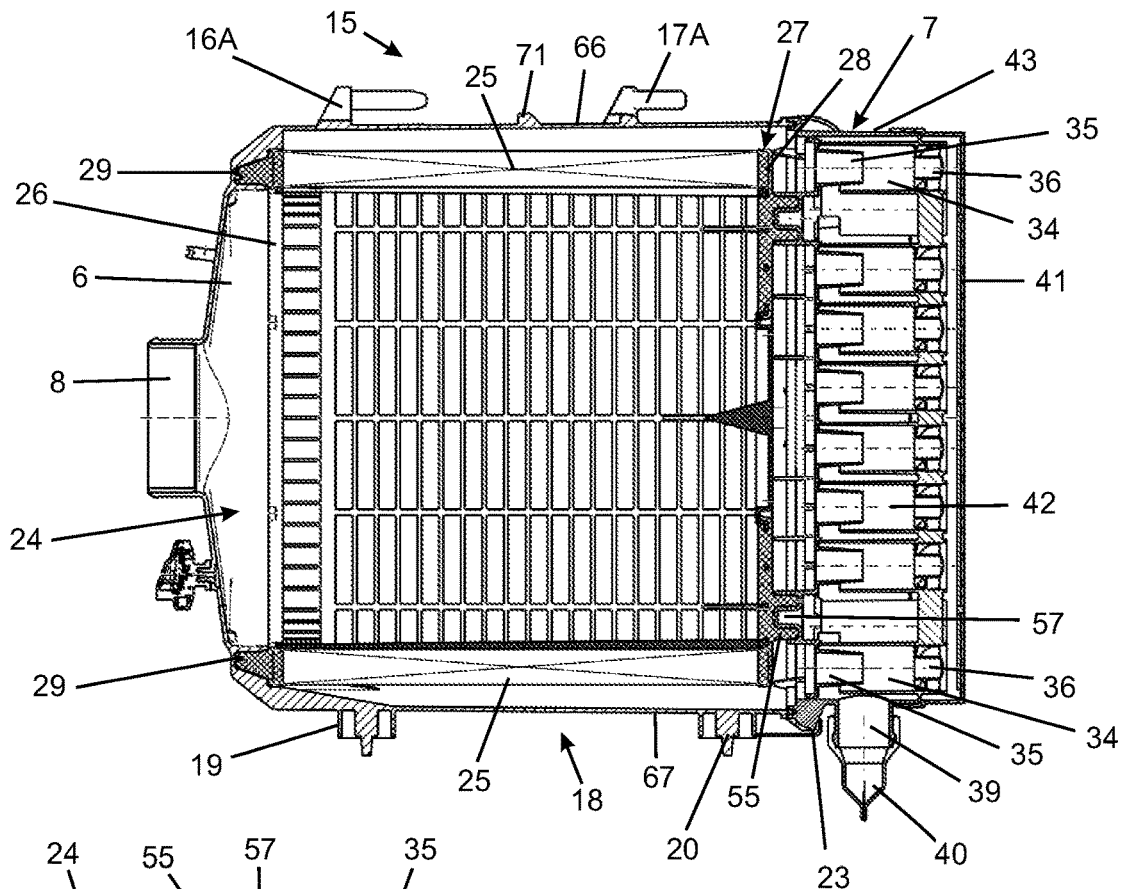
FIG. 13 is a longitudinal-sectional view of the filtering device.

In conformity with the functioning of filtering device 1, the air enters through intake cover 7 (arrow 30) and crosses it where a pre-purification operation takes place, which leads to the expulsion of the heaviest particles (arrow 31). The pre-cleaned air leaves intake cover 7, goes around cover 28, and is filtered (arrow 33) by passing the filter media of the filtering element 24. Finally filtered air leaves through filtered air outlet 8 (arrow 33). FIG. 13 is also a sectional view of filtering device 1, and puts in evidence three details of its construction, which will be individually explained below.

Figure 14:
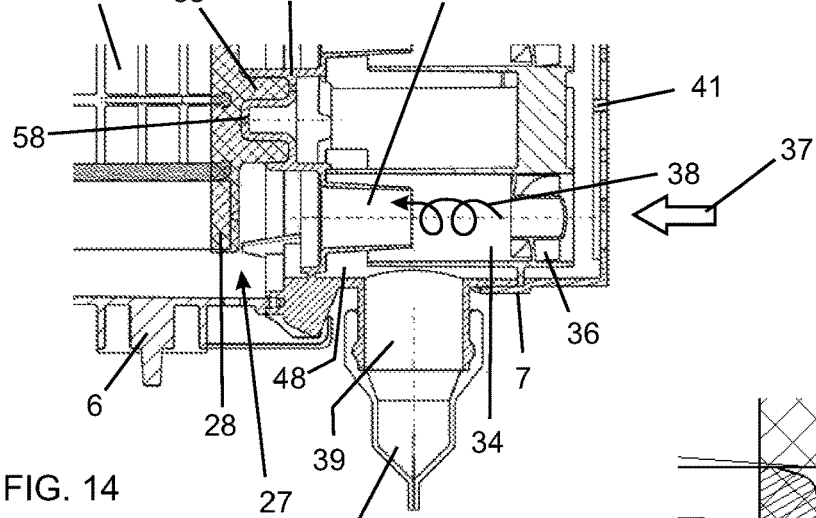
FIGS. 14, 15 and 16 are enlarged views of FIG. 13, of details XIV, XV, and XVI, respectively.

Detail XIV of FIG. 13 is enlarged in FIG. 14 and illustrates the pre-purification operation. Intake cover 7 includes a pre-cleaner of "cyclone" type (also called "vortex" pre-cleaner).

The functioning of the cyclone pre-cleaner is described below.

Intake cover 7 preferably includes plurality of cyclone cells of the inline-cyclone type, wherein each one of them comprises a swirl pipe 34 cooperating with a discharge pipe 35.

The swirl pipe includes a helix 36 in its entrance to make incoming air (arrow 37) rotate (arrow 38). The heaviest particles, such as dust and water contained in the air are thus driven against the wall of swirl pipe 34, due to centrifuge force generated by rotation 38, and move around discharge pipe 35, without entering it. The heavy particles, which moved around discharge pipe 35, leave through an opening 48 and fall by gravity in an expulsion pipe 39 of the pre-cleaner, which equipped with a valve 40, allowing the particles to leave, but avoiding air intake. The pre-purified air, free of particles, enters discharge pipe 35 to reach the cavity delimited by housing body 6. The pre-purified air is then filtered by filtering element 24, as explained above.

One preferred construction of the cyclone pre-cleaner is described below.

Figure 17:
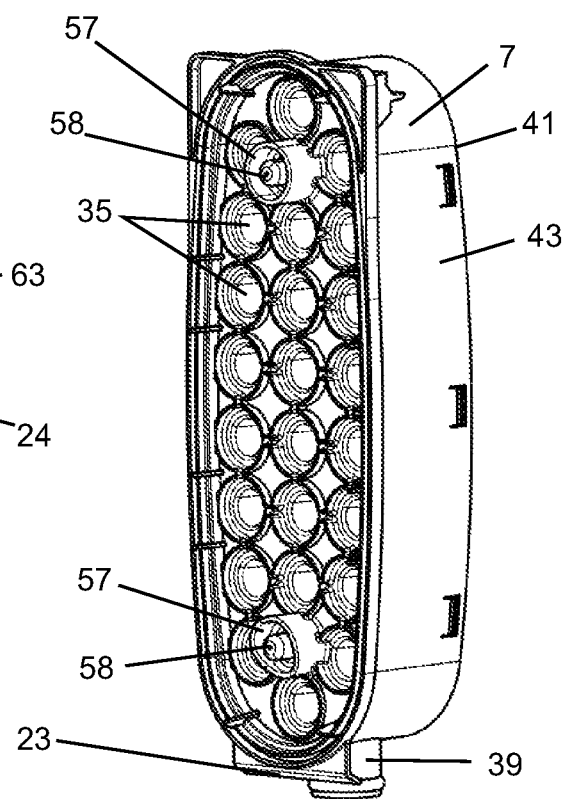
FIG. 17 is a perspective view of the intake cover of the filtering device.

The front view of an advantageous intake cover 7 is represented in FIG. 11 and its rear view is represented in FIG. 17.

Figure 18:
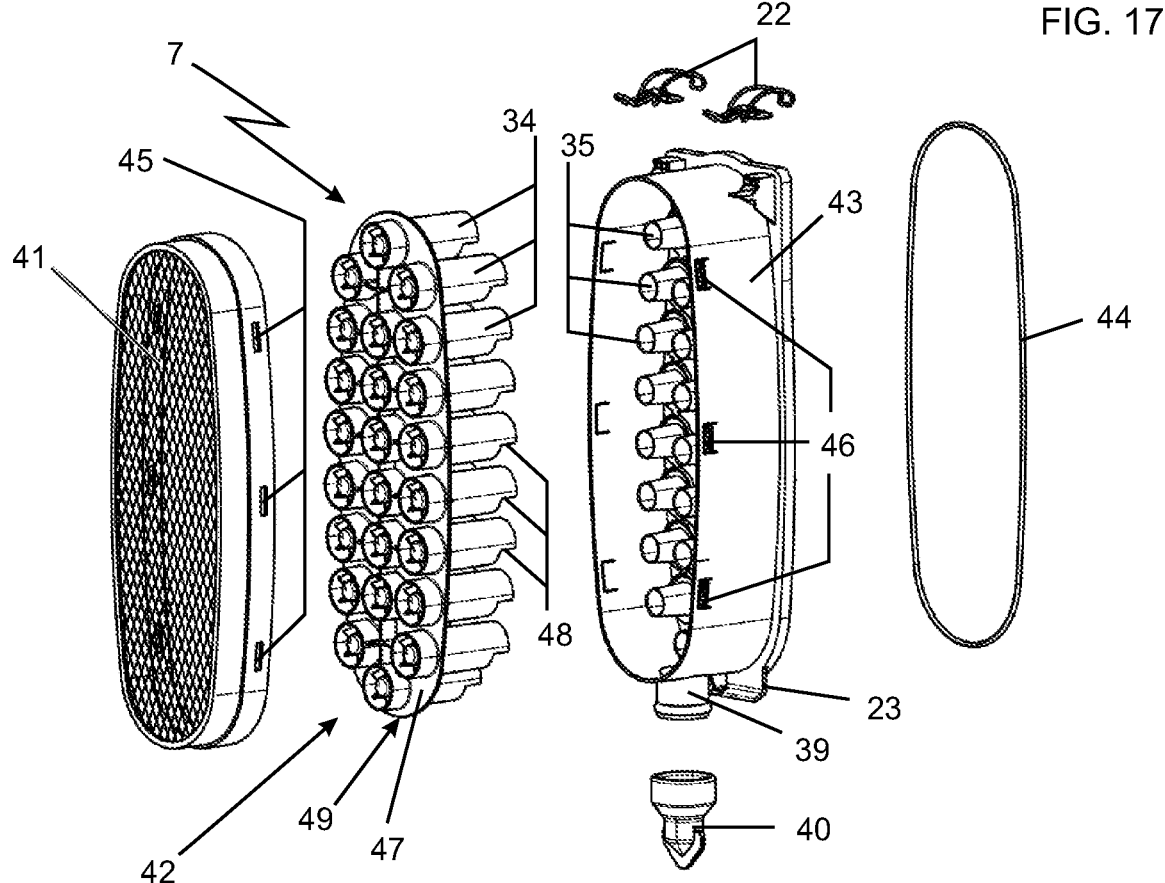
FIG. 18 is an exploded view of the intake cover of the filtering device.

The exploded view of FIG. 18 shows that the intake cover may comprise three slotted elements: a grid 41, a set of swirl pipes 42, and a base 43.

Valve 40 is preferably slotted in base 43 and one gasket of cover 44 is provided between intake cover 7 and housing body 6, for sealing purposes.

Grid 41 and base 43 are preferably fastened to each other by means of snap-on fittings 45, 46 so that to enclose the set of swirl pipes 42.

Snap-on fittings may include perforations 45 made on grid 41 and complementary clips 46 made on base 43.

Swirl set 42 preferably comprises a plurality of swirl pipes 34 pooled on plate 47. Plate 47 presents a peripheral end 49 around swirl pipes 42 which allows fastening of plate 47 to base 43 and grid 41.

Swirl set 34 may be advantageously and integrally molded in only one piece.

Figure 19:
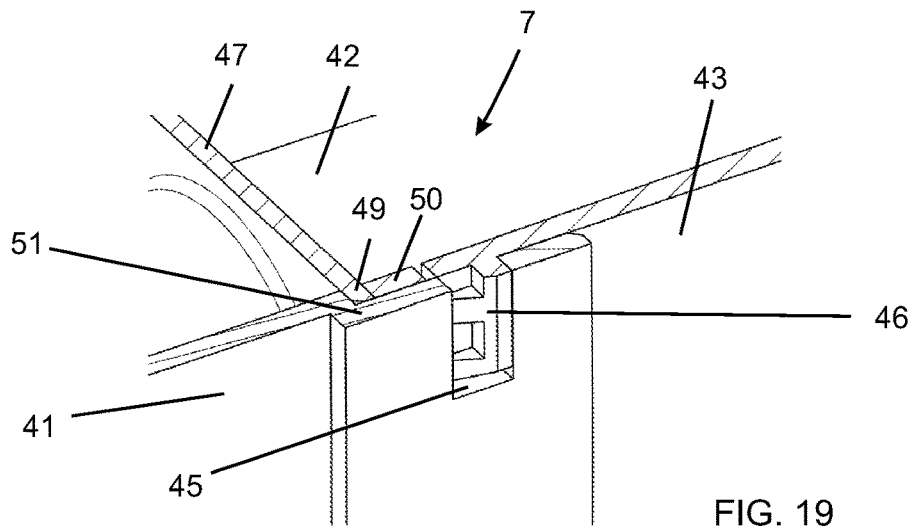

FIG. 19 is a perspective view of a cross section of a preferred intake cover 7, at the level of snap-on fittings 45 and 46, and shows the preferred cooperation of base 43, of grid 41, and of swirl set 42.

Clip 46 is slotted in perforation 45 to fasten grid 41 and base 43. Moreover, base 43 presents an edge 50 and grid 41 presents a shoulder 51 arranged so that peripheral end 49 of swirl set 42 is fastened between such edge 50 of base 43 and shoulder 51.

Thus, the pre-cleaner preferably comprises only three pieces 41, 42, 43 and the simple slot of snap-on fittings 45, 46 allows fastening and positioning of three pieces 41, 42, 43 one with respect to the others.

Figure 20:
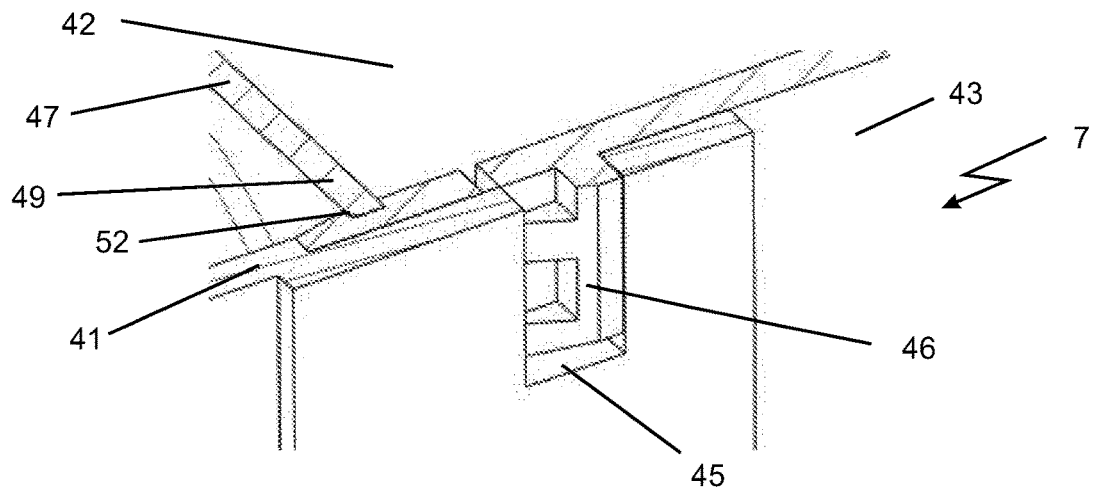
Figure 21:
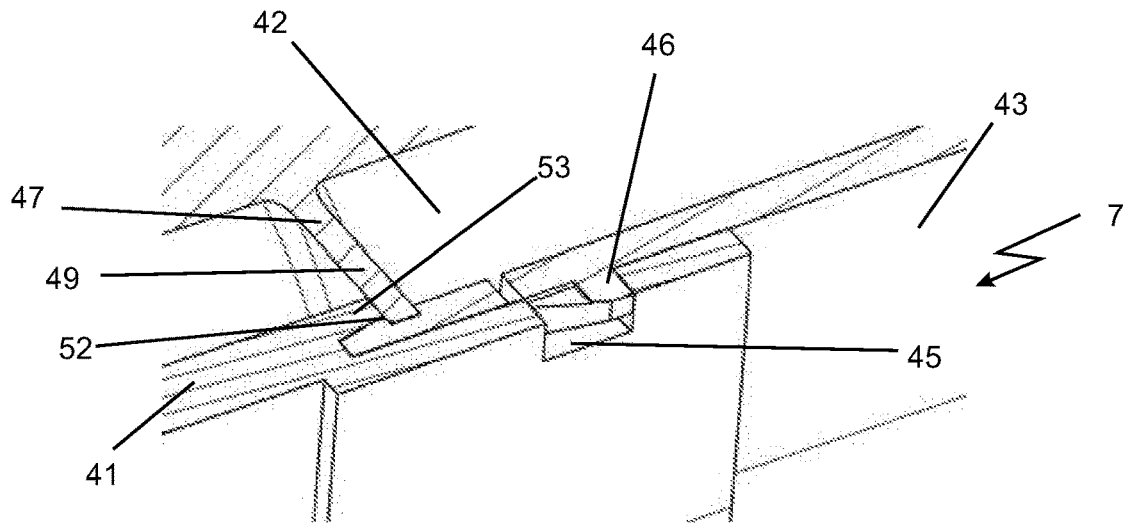

FIGS. 20 and 21 illustrate two alternatives to carry out the slot.

In the first alternative of FIG. 20, peripheral end 49 of swirl set 42 is, this time, fastened in a groove 52 made on base 43.

In the second alternative of FIG. 21, peripheral end 49 of swirl set 42 is also fastened in a groove 52 and, furthermore, grid 41 has a bracket 53 for said peripheral end 49.

With regard to FIG. 22, base 43 includes discharge pipes 35 which are slightly conical so that they can cooperate with swirl pipes 34 in the pre-cleaning function.

A seal may be used in between each swirl pipe 34 and the corresponding discharge pipe 35, but in opening area 48, to let heavy particle out only through such opening 48. With regard to enlarged view of FIG. 23, this seal preferably comprises a ledge 54 which is coaxial with discharge pipe 35, placed all around discharge pipe 35, but in opening area 48. The slot of swirl pipe 34 against this ledge 54 realizes this seal which is, thus, achieved together with the simple slots of snap-on fittings 45, 46 and allows fastening and positioning of the three pieces 41, 42 and 43, one with respect to the others.

The cooperation of one preferred embodiment of intake cover 7 with one preferred embodiment of filtering element 24 is described below, with respect to detail XV of FIG. 13, which is enlarged in FIG. 15.

Fastening of filtering element 24 on housing body 6 is advantageously carried out by means of intake cover 7 which retains filtering element 24 so that gasket 29 is compressed against housing body 6.

In order to carry out this function, cover 28 of filtering element 24 preferably includes a pair of first tubular bosses 55, which project perpendicularly away from cover 28, towards intake cover 7. These first tubular bosses 55 can be integrally molded with cover 28.

The first tubular bosses 55 can exhibit different sections, such as, for example, rounded, squared or oval.

In the present embodiment the first tubular bosses 55 are round in section, that is, the first tubular bosses 55 are cylindrical.

Figure 15:
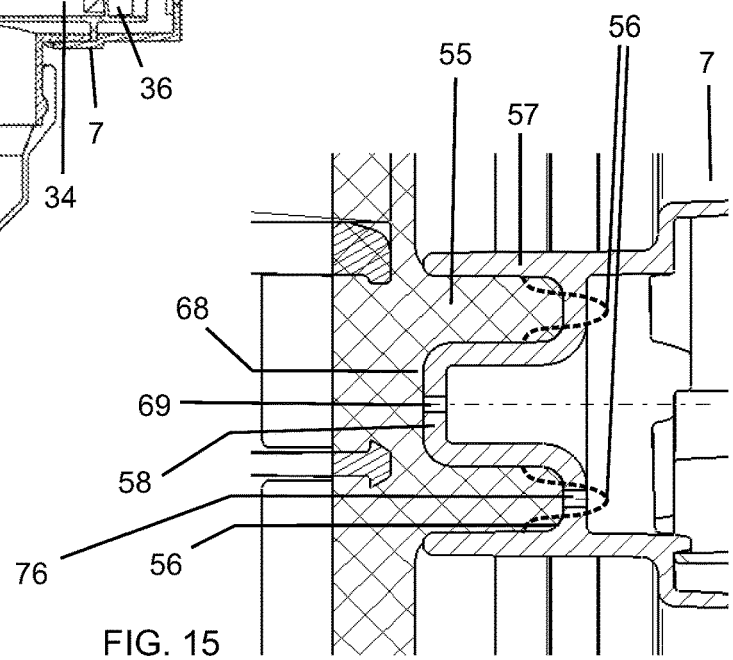

With reference to FIG. 15, each first tubular boss 55 presents a cavity 68 along its axis and also a beveled end 56 on its edge. In this preferred embodiment, one tubular boss 55 is located on the upper part of the cover 28 and the other one is located on the lower part, especially symmetrically to the middle axis of the filtering element 24. This allows mounting the filter element in both geometrically possible orientations. In regard to function, only one especially central or more than two eccentric bosses could also be used to support the filtering element 24 on the intake cover 7.

Base 43 of intake cover 7 includes a pair or other corresponding number of second hollow tubular bosses 57, which are placed in correspondence with the first tubular bosses 55 and allow the slot of first tubular bosses 55.

On FIG. 15, the beveled end 56 is represented with dotted lines, illustrating his form when a preferred embodiment of the first tubular boss 55 is not slotted in the preferred corresponding second tubular boss 57. After the first tubular boss 55 being slotted in the second tubular boss 57, the beveled end 56, which is made of elastically deformable material, fits the bottom of the second tubular boss 57.

Each second tubular boss 57 preferably presents along its axis a central bracket 58 which may insert in cavity 68 and which is thus applied against cover 28 when the first tubular boss 55 is slotted in the second tubular boss 57.

FIG. 17 shows one embodiment of the second tubular bosses 57 on base 43.

The interface between intake cover 7 and filtering element 24 is thus preferably made by the application of central bracket 58 against cover 28 and, simultaneously, by the compression of beveled end 56 on the bottom of second hollow tubular boss 57.

The lengths of beveled end 56 and central bracket 58 are preferably such that, at the time of closing intake cover 7, beveled end 56 reaches the bottom of second tubular boss 57 before central bracket 58 reaches cover 28. That is, the distance between cover 28 and beveled end 56 is preferably greater than the distance between central bracket 58 and the bottom of second tubular boss 57.

Beveled end 56 is preferably compressed against the bottom of the second boss 57 insofar as the intake cover is closed. Central bracket 58 may be finally placed against cover 28, once beveled end 56 is compressed and fitted into the bottom of the second tubular boss 57.

This allows a reduction and a progressivity of the strength needed to close the intake cover.

For air emission when central bracket 58 is inserted in cavity 68, central bracket 58 may be equipped with an exhaust hole 69 and the bottom of the second tubular boss 57 may be equipped with an exhaust hole 76 (FIG. 15).

This interface has a first retention function of filtering element 24 for its cover 28, a second sealing function by the application of the pressure on cover 28, which allows the compression of gasket 29 against housing body 6, and a third spacer function by keeping a space needed for air circulation between intake cover 7 and cover 28 (see FIG. 12).

The first retention operation of filtering element 24 is safely carried out with regard to shocks and vibration along all axes.

Figure 16:
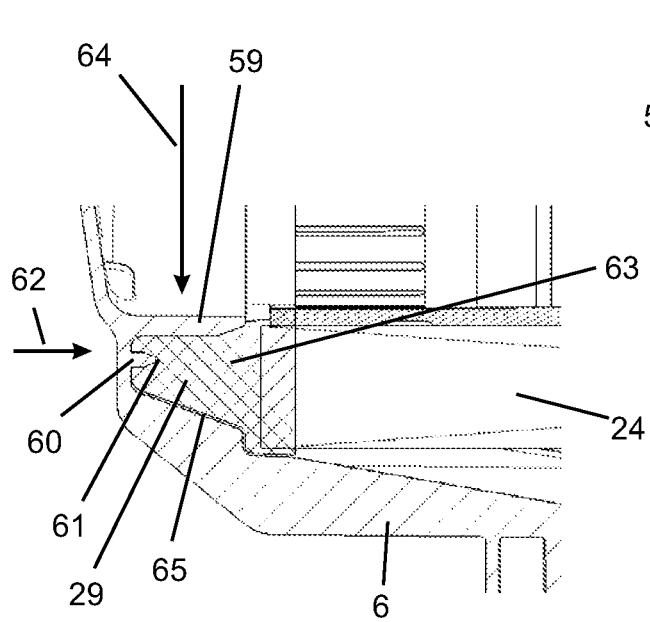

One preferred embodiment with several preferred features of the seal between filtering element 24 and housing body 6 is described below, with reference to detail XVI of FIG. 13 which is enlarged in FIG. 16.

Housing body 6 presents an axially-arranged annular bead 59 around filtered air outlet 8, and a gasket border 60 around this annular bead 59.

Gasket 29 of filtering element 24 preferably presents an axial groove 61 that is slotted in gasket border 60. This ensures axial sealing (arrow 62) and preferably also radial sealing and supports the main radial sealing function described below.

Gasket 29 includes an inner annular wall 63 leaning against annular bead 59 which creates the main radial sealing function.

Gasket 29 preferably presents such a thickness that the radial distance between axial groove 61 and inner annular wall 63 is greater than the distance between gasket border 60 and annular bead 59. In this way, when axial groove 61 is embedded in gasket border 60, gasket 29 is compressed radially between annular bead 59 and gasket border 60, which also results in radial sealing (arrow 64).

Housing body 6 preferably presents an annular ramp 65 designed to guide axial groove 61 in direction of gasket border 60 during the assemblage of filtering element 24 on housing body 6.

FIGS. 24 and 25 show the frontal view of the filtering device without intake cover 7. Filtering element 24 is preferably kept across housing body 6 with slides 73 placed on rails 74 (FIG. 25) and is furthermore preferably kept longitudinally with the first and second tubular bosses, 55 and 57, compressing gasket 29. The slides 73 are each arranged on opposite circumferential edges of the cover 28 and project radially outwards. Each slide has a first rounded bulge projection 73A formed on a first end of the slide 73 and a second rounded bulge projection 73B formed on an opposite second end of the slide 73. An indented depression 73C is formed in the slide 73 between first rounded bulge projection 73A and the second rounded bulge projection 73B. The indented depression 73C is configured to receive and slide on a rail 74 provided on an interior the housing body 6.

Filtering device 1 is accessible from the outside of the vehicle and the operation of filter replacement only needs intake cover 7 to be opened. Afterwards filtering element 24 used is withdrawn by hand, pulling cover 28, and new filtering element 24 is axially inserted. When slides 73 and rails 74 are provided as preferably proposed, the filtering element 24 is axially inserted until slides 73 runs on rails 74 and until annular ramp 65 drives gasket 29 so that axial groove 61 slots in gasket border 60 and the annular sealing takes place. Filtering element 24 is preferably compressed by two second tubular bosses 57 against first tubular bosses 55, wherein the pressure is preferably maintained by closing intake cover 7.

Gasket 29 and cover 28, with two first tubular bosses 55 and slides 73, can be made of either polyurethane foam or another elastomer, or also a thermoplastic elastomer, which allows sealing functions.

The housing body and the intake cover are made of a rigid material like injection molded thermoplastic material.

Although a preferred embodiment has been described, the scope of the present invention includes other possible variations, and is only limited by the content of the attached claims, which include the possible equivalents.

For instance, the filtering device may filter another fluid than air.

If the filtering device is used as air filter in a combustion engine, it can be mounted on any type of vehicle as well as on other mobile or stationary machines such as a generator unit.

What is claimed is:
1. A filtering device (1), comprising:
 a housing body (6) which encloses a cavity within the housing body, the housing body including
 a filtered air outlet (8);

a tubular filtering element (24) installed within the cavity and having
   an open axial end (26) arranged at and in flow communication with the filtered air outlet (8); and
   an axial end (27) closed by a cover (28); and
an intake cover (7) which closes the cavity opposite the filtered air outlet (8);
wherein the cover (28) includes
   at least a first tubular boss (55) projecting towards the intake cover (7); and
   at least a second tubular boss (57) complementary to the first tubular boss (55) and projecting towards the cover (28);
   wherein the first tubular boss (55) being slotted in the second tubular boss (57);
   wherein the second tubular boss (57) includes
      a bracket (58) arranged lying against the cover (28) such that the cover (28) and the intake cover (7) are held spaced apart from each other;
   wherein the first tubular boss (55) has a cavity (68) arranged along an axis of the first tubular boss;
   wherein the central bracket (58) includes an exhaust hole (69).

2. The filtering device (1) according to claim 1,
wherein the bracket (58) is a central bracket (58) arranged on the axis of the second cylindrical boss (57);
wherein the central bracket central (58) is inserted into the cavity (68) of the first tubular boss.

3. The filtering device (1) according to claim 1, wherein the first tubular boss (55) presents a beveled end (56) on its edge.

4. The filtering device (1) according to claim 3, wherein the beveled end (56) is compressed at the bottom of the second tubular boss (57).

5. The filtering device (1) according to claim 4, wherein a distance between the cover (28) and the beveled end (56) is greater than a second distance between the bracket (58) and the bottom of the second tubular boss (57).

6. The filtering device (1) according to claim 1, wherein the first tubular boss (55) and the second tubular boss (57) are round in section.

7. The filtering device (1) according to claim 1, wherein the cover (28) includes two first tubular bosses (55); and the intake cover (7) includes two second tubular bosses (57).

8. A filtering device (1), comprising:
a housing body (6) which encloses a cavity within the housing body, the housing body including
   a filtered air outlet (8);
a tubular filtering element (24) installed within the cavity and having
   an open axial end (26) arranged at and in flow communication with the filtered air outlet (8); and
   an axial end (27) closed by a cover (28); and
an intake cover (7) which closes the cavity opposite the filtered air outlet (8);
wherein the cover (28) includes
   at least a first tubular boss (55) projecting towards the intake cover (7); and
   at least a second tubular boss (57) complementary to the first tubular boss (55) and projecting towards the cover (28);
   wherein the first tubular boss (55) being slotted in the second tubular boss (57);
wherein the intake cover (7) includes a cyclone pre-cleaner.

9. A tubular filtering element (24) having
an axis extending through an interior of the filter element;
an open axial end (26) opening into the interior;
an opposite axial end (27) closed by a cover (28);
wherein the cover (28) includes
   at least a first tubular boss (55) projecting perpendicularly to the cover (28);
slide members (73) arranged on opposite circumferential edges of the cover (28), the slide members (73) projecting radially outwards away from a circumferential outer edges of the cover (28), wherein each slide member (73) comprises:
   a first rounded bulge projection (73A), formed on a first end of the slide member (73) and projecting radially outwardly away from the circumferential outer edges of the cover (28);
   a second rounded bulge projection, formed on an opposite second end of the slide member (73) and projecting radially outwardly away from the circumferential outer edges of the cover (28); and
   an indented depression (73C) formed in the slide member (73) between the first rounded bulge projection (73A) and the second rounded bulge projection (73B), the indented depression (73C) configured to receive and slide on a rail (74) provided on an interior side of a housing body (6) that is adapted to receive the tubular filtering element (24).

10. The tubular filtering element (24) according to claim 9, wherein
   the tubular boss (55) has a cavity (68) extending on an axis of the tubular boss.

11. The tubular filtering element (24) according to claim 10, wherein
   the first tubular boss (55) presents a beveled end (56) on its edge.

12. The tubular filtering element (24) according to claim 9, wherein
   the tubular filter element includes two of the said first tubular bosses (55).

13. The tubular filtering element (24) according to claim 9, wherein
   the cover (28) includes two slides (73).

14. A method of maintaining a filtering device (1), comprising
   a housing body (6) which encloses a cavity within the housing body, the housing body including
      a filtered air outlet (8);
   a tubular filtering element (24) installed within the cavity and having
      an open axial end (26) arranged at and in flow communication with the filtered air outlet (8); and
      an axial end (27) closed by a cover (28); and
   an intake cover (7) which closes the cavity opposite the filtered air outlet (8);
   wherein the cover (28) includes
      at least a first tubular boss (55) projecting towards the intake cover (7); and
      at least a second tubular boss (57) complementary to the first tubular boss (55) and projecting towards the cover (28);
      wherein the first tubular boss (55) being slotted in the second tubular boss (57);
      wherein the second tubular boss (57) includes
         a bracket (58) arranged lying against the cover (28) such that the cover (28) and the intake cover (7) are held spaced apart from each other;

wherein the first tubular boss (55) has a cavity (68) arranged along an axis of the first tubular boss; and wherein the central bracket (58) includes an exhaust hole (69);

wherein the method comprises the steps:

opening the intake cover (7);

withdrawing the tubular filtering element (24) from the housing body;

inserting a new tubular filter element into the cavity inside the housing body (6);

closing the intake cover (7) so that the first tubular boss (55) of the cover (28) is slotted into the second tubular boss (57) of the intake cover (7) with the bracket (58) arranged lying against the cover (28) such that the cover (28) and the intake cover (7) are held spaced apart from each other.

* * * * *